United States Patent
Smith et al.

(10) Patent No.: US 9,529,578 B2
(45) Date of Patent: Dec. 27, 2016

(54) AUTOMATED SERVICE VERSION UPGRADING

(75) Inventors: Virginia Smith, Auburn, CA (US); Bryan P. Murray, Duvall, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 613 days.

(21) Appl. No.: 12/908,685

(22) Filed: Oct. 20, 2010

(65) Prior Publication Data

US 2012/0102479 A1 Apr. 26, 2012

(51) Int. Cl.
*G06F 9/44* (2006.01)
*G06F 9/445* (2006.01)

(52) U.S. Cl.
CPC ..................... *G06F 8/65* (2013.01)

(58) Field of Classification Search
None
See application file for complete search history.

(56) References Cited

U.S. PATENT DOCUMENTS

| | | | | |
|---|---|---|---|---|
| 6,074,434 A | * | 6/2000 | Cole et al. | 717/173 |
| 7,949,999 B1 | * | 5/2011 | Willeford | 717/120 |
| 8,595,186 B1 | * | 11/2013 | Mandyam et al. | 707/632 |
| 2006/0075001 A1 | * | 4/2006 | Canning et al. | 707/203 |
| 2006/0168578 A1 | * | 7/2006 | Vorlicek | 717/168 |
| 2008/0140759 A1 | * | 6/2008 | Conner et al. | 709/201 |
| 2008/0196022 A1 | * | 8/2008 | Diederichs | 717/173 |
| 2009/0183150 A1 | * | 7/2009 | Felts | 717/173 |
| 2009/0260004 A1 | * | 10/2009 | Datta et al. | 717/175 |
| 2011/0321032 A1 | * | 12/2011 | Ciccone | 717/171 |

OTHER PUBLICATIONS

Subbu Allamaraju, "RESTful Web Services Cookbook," O'Reilly, Mar. 2010.*
Milowski, "A Short Introduction to the Atom Publishing Protocol," Sep. 2009.*
Salehie et al., "Self-Adaptive Software: Landscape and Research Challenges," ACM, Mar. 2009.*
"How to Version RESTful Web Services," Apr. 2010.*
"The Atom Publishing Protocol," Network Working Group, Copyright © The IETF Trust (2007).*

* cited by examiner

*Primary Examiner* — Insun Kang
(74) *Attorney, Agent, or Firm* — Conley Rose, P.C.

(57) ABSTRACT

A method consists of upgrading, at a server, a service from a first version to a second version, receiving a request from a client associated with the first version of the service, sending a response to the client indicating that the server supports the second version of the service, communicating with the client using the second version of the service as a result of receiving a communication from the client utilizing the second version of the service after sending the response, and communicating with the client using the first version of the service as a result of receiving a communication from the client utilizing the first version of the service after sending the response.

18 Claims, 8 Drawing Sheets

```xml
<?xml version="1.0" encoding='utf-8'?>
<service xmlns="http://www.w3.org/2007/app"
        xmlns:atom="http://www.w3.org/2005/Atom"
        xmlns:v="urn:x-auto-version:version">
    <workspace>
        <atom:title>
            HelpDesk Service
        </atom:title>
        <v:version>1</v:version>
        <collection
                href="http://example.org/incidents">
            <atom:title>
                Incidents
            </atom:title>
            ...
        </collection>
        <collection
                href="http://example.org/operators">
            <atom:title>
                Operators
            </atom:title>
            ...
        </collection>
        ...
    </workspace>
    <workspace>
        <atom:title>
            HelpDesk Service
        </atom:title>
        <v:version>2</v:version>
        <collection
                href="http://example.org/v2/incidents">
            <atom:title>
                Incidents
            </atom:title>
            ...
        </collection>
        <collection
                href="http://example.org/v2/operators">
            <atom:title>
                Operators
            </atom:title>
            ...
        </collection>
        ...
    </workspace>
    ...
</service>
```

Figure 2

```
<?xml version="1.0" encoding="utf-8"?>
<feed xmlns="http://www.w3.org/2005/Atom">
    <title>Incidents</title>
    <link rel="self"
          href="http://example.org/rooms"/>
    <link rel="newer-version"
          href="http://example.org/v2/incidents"
          version="2"/>
    <link rel="service-document"
          href="http://example.org"/>
    <updated>2010-01-13T18:30:02Z</updated>
    <author>
        <name>...</name>
    </author>
    <id>...</id>
    <entry>
    ...
    </entry>
</feed>
```

AUTOMATED SERVICE VERSION UPGRADING

BACKGROUND

Distributed architectures comprise clients and servers. Clients initiate requests to servers; servers process requests and return appropriate responses. One example of a distributed architecture is the Representational State Transfer (REST) architecture. In REST-style architectures, requests and responses are built around the transfer of "representations" of "resources." A resource can be essentially any coherent and meaningful object that may be addressed, such as a database. A representation of a resource may be a document that captures the current or intended state of a resource, such as a HyperText Markup Language (HTML) or Extensible Markup Language (XML) file that represents some or all of the database records.

The resource-oriented nature of certain distributed architectures, for example REST-style architectures, allows the client and server to be much more loosely coupled than is possible using an operation-oriented approach. For example, if an application installed on a server has a set of services that all use the same uniform interface and a client application installed on a client understands the data model for the resources provided by one service, then that client application can connect to another service providing some of the same types of resources without modification. However, at some point, services need to modify their data models, which can result in changes that are not backwards compatible with client applications in communication with the services.

While loosely-coupled integrations allow for the client application and service to evolve independently, a change in the data model or functionality that is not backwards compatible causes an integration configuration problem during upgrades. With multiple versions of the client application and multiple versions of the service available in the field, it is necessary to configure which version of the service to which a client application connects. This is a manual process that is performed by administrators or IT personnel and is error-prone. Additionally, applications participating in solution integrations rarely follow the same upgrade timeline, which leads to uncertainty as to when and how an administrator should configure a new version of an integration and as to what happens if there are multiple application versions that exist in a customer's environment.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

A "solution" is a set of standalone products that are able to interact with each other when installed together in order to provide a more complete product. For example, an end-to-end IT management solution comprises an operations management product (product A) that detects events and metric anomalies, a root cause and business impact analysis product (product B), a helpdesk product (product C), and remediation automation product (product D). Standalone products provide functionality without the need to interact with another product. Each of products A, B, C and D can be used as a standalone product in a customer environment, but together they may enable a more comprehensive, synergistic solution. Standalone products may communicate with each other (e.g., by way of requests and responses), however they do not exert any other control over other products in the solution.

An "integration" is a point of communication between two standalone products for the purpose of sharing resources. In general, there are two parties to every integration, for example, a client and a server. The difference between the two parties is that a client initiates communication by making a request, whereas a server listens for connections and responds to requests in order to supply access to its services. Thus, a single component may comprise both a client and a server, depending on its connections to, and interactions with, other components.

A "client application" refers to a standalone application that operates on a client and makes requests of a service for some information or action and a "service" refers to a standalone application that operates on a server and responds to client application requests. A standalone application is capable of providing functionality to a user independent of its interaction with other applications. Furthermore, a standalone application may communicate and interact with a multitude of different services (in the case of a client application) or a multitude of different client applications (in the case of a service). A standalone application may comprise both a client application and a service. However, in the following discussion and in the claims a standalone application may be described as either a service or a client application for simplicity.

An "endpoint" is the implementation of an interface between a client application and a service application. In a distributed architecture, such as a REST-style web service, an endpoint may be defined, for example, by a set of related Uniform Resource Locators (URLs) and the Hypertext Transfer Protocol (HTTP) methods that are valid for those URLs. For example, to access a particular version of a service, a client application accesses a known endpoint, such as a URL, and provides requests to the service and receives responses from the service through the endpoint. The endpoint implementation acts as the server in an integration. In some embodiments, multiple integrations may be supported between a client and a server.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with various embodiments, automated upgrades to client applications and services are provided in a system to configure or re-configure one or more integrations in the system. For example, a client application that communicates with a service automatically discovers when the service is upgraded, and the client application reconfigures itself to use the newer version of the service without requiring manual intervention by an administrator or IT personnel. Standards used in REST-style architectures, such as HTTP, Atom Syndication Format (ASF), and Atom Publication Protocol (APP) are leveraged to allow the client application to reconfigure itself. Incorporating version information in the messages exchanged between the client application and the service allows the products participating in an integration to maintain their relationship automatically and use the latest version of the integration that the client application supports and that the service provides. One skilled in the art would appreciate that various embodiments may leverage different distributed architectures, such as Simple Object Access Protocol (SOAP).

The functionality added to the existing communication between client applications and services comprises a discovery process and a notification process. The discovery process allows a client application to request from a service what available versions the service supports. Additionally, the discovery process allows a service to advertise what available versions the service supports and inform a client application so that the client application may access one or more versions. The notification process facilitates installing a newer version of a service without requiring a manual reconfiguration of an application that is a client application of that service. The new version of the service may be installed in parallel with an existing version of the service. Additionally, the notification process facilitates notifying a client application that a newer version of a service is available when the service is upgraded to a newer version.

In accordance with various embodiments, a service maintains a service document. The service document is provided regardless of the format used to exchange messages. The service document may be, for example, an APP service document that is provided regardless of whether messages are exchanged using ASF or any other representation, such as HTML or SOAP. The service document specifies all available versions of a service offered and specifies which service endpoint is to be used for each such version. Thus, a client application reads the service document when the client application begins using the service, which allows the client application to select the appropriate version of the service that the client application supports. When the client application selects the appropriate version of the service, the client application also knows the location of the endpoint to use to access the appropriate version of the service. In an exemplary embodiment, the client application is initially configured such that the client application is aware of the location of the service document.

In accordance with various embodiments, a service is aware of the latest version that it provides. Thus, when the service receives a request from a client application that is not associated with the latest version of the service, the service sends a response to the client application that includes a notification that a newer version of the service is available. The response also includes the location of the endpoint associated with the newer version of the service or the location of the service document. When the client application receives a notification indicating that a newer version of the service is available, the client application accesses the service document to discover the versions provided by the service. Alternatively, the client application directly accesses the newer version of the service by using the location of the newer version of the requested service indicated in the notification, without first accessing the service document. If the client application does not yet support a newer version (e.g., the client application's request is made using its most recent version), the client application ignores the new version notification from the server.

Figure 1A:
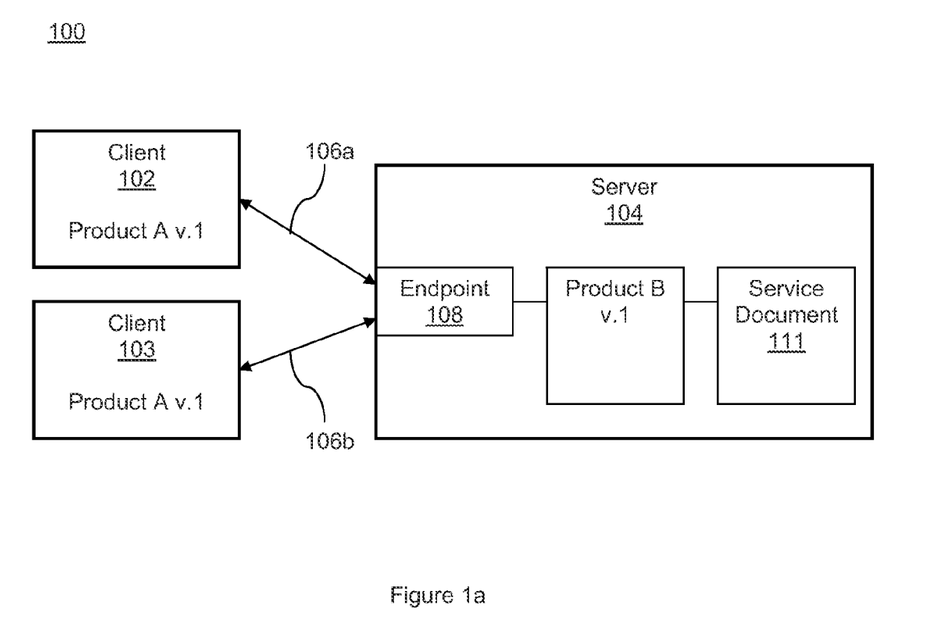
FIGS. 1*a*, 1*b* and 1*c* show various client-server solutions in accordance with various embodiments.

FIG. 1a shows a first solution 100 in accordance with various embodiments. The solution 100 comprises clients 102, 103 coupled to a server 104. The clients 102, 103 may comprise personal computers, handheld computers, laptop computers, workstations or other computing devices known to those skilled in the art. The clients 102, 103 have Product A, version 1 installed and the server 104 has Product B, version 1 installed. Product A is a client application and Product B is a service. In an exemplary embodiment, the functionality of version 1 of each product is the same, so that the clients 102, 103 support, or are currently able to take advantage of all the functionality provided by, Product B. Product A on clients 102, 103 and Product B on server 104 are designed to interact with one another to form the solution 100 by way of integrations 106a, 106b. The clients 102, 103 are initially configured with the location of Product B's service document 111, which specifies the endpoint 108 of a service offered by Product B, version 1. In one embodiment, the service document 111 may comprise an APP service document that specifies all available versions of Product B and specifies which endpoint is to be used for each such version. The clients 102, 103 are thus able to use the service through the known endpoint 108. The clients 102, 103 send requests to the server 104 using the endpoint 108. The responses from the server 104 to the clients 102, 103 reflect the functionality provided by version 1 of Product B.

Figure 1B:
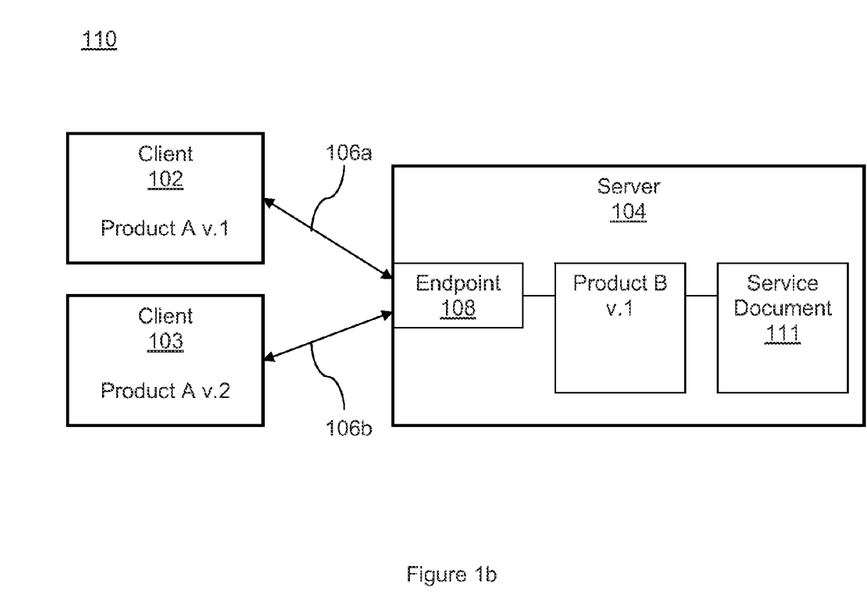

A customer, for example an IT provider, might upgrade Product A on the client 103 to version 2, shown in FIG. 1b as a second solution 110. However, Product A on the client 102 is not upgraded and remains as version 1. For example, Product A, version 2 may add the ability to request and to receive and use additional diagnostic information in a record produced by Product B. The client 103 does not know whether Product B has been upgraded, and thus sends a request to the server 104 using the endpoint 108. The request does not take advantage of the added functionality of version 2 of Product A (e.g., the request does not ask for the additional diagnostic information or a new format of a record produced by Product B) because the client 103 does not know whether Product B has been upgraded. The server 104 receives the request and, because Product B has not been upgraded, sends a response that contains the functionality present in version 1 of Product B, as above (e.g., the response does not include additional diagnostic information in a record having a new format, which is enabled by version 2 of Product A and may be enabled by version 2 of Product B). Thus, the client 103 continues to access Product B by way of the endpoint 108, and does not yet take advantage of the additional features of version 2 of Product A.

Figure 1C:
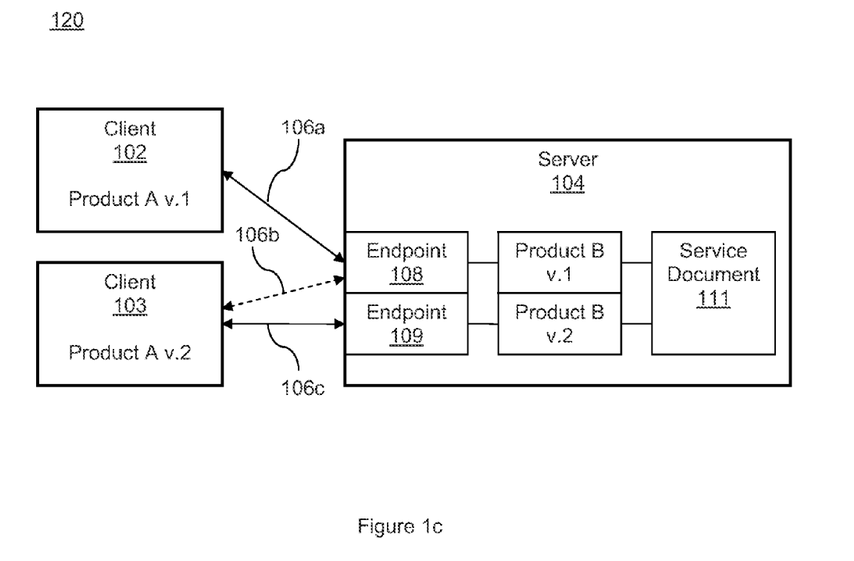

After Product A on the client 103 has been upgraded, the customer might upgrade Product B to version 2 on the server 104, which adds an enhancement to Product B's functionality (e.g., the ability to receive a request for a record containing additional diagnostic information, sending a response that includes a record containing the additional diagnostic information). This is shown in FIG. 1c as a third solution 120. The server 104 includes two instances of Product B, one instance is version 1 and the other instance is version 2, and each instance has its own endpoint 108, 109, respectively. In an alternate embodiment, a single instance of Product B provides both version 1 and version 2 of a service. Continuing the above version functionality example, Product B, version 2 now has the functionality to add additional diagnostic information to a record produced by Product B. Product B's service document 111 is also amended to specify the endpoint 109 of Product B, version 2 in addition to the endpoint 108 of the previous version.

Version 2 of Product A on the client 103 is not aware that Product B has been upgraded and thus the next time Product A sends a request to Product B, Product A sends the request using the endpoint 108 (indicated by the dashed arrow 106b). As a result of receiving a request from either client 102, 103 at the endpoint 108, which does not reflect the latest version of Product B provided by the server 104, the server 104 notifies the client 102, 103 that a newer version of Product B is available and provides a link to the Product B's updated service document 111 or to the new endpoint 109 of the new version of Product B.

The client 102 has not upgraded beyond version 1 of Product A. In some embodiments, Product A, version 1 is aware that it is already communicating with the highest-version endpoint 108 of Product B that Product A, version 1 supports, and thus Product A, version 1 ignores the message from the server 104 that a new version is available. In other embodiments, Product A, version 1 accesses Product B's updated service document 111 to verify that the client 102 is communicating with the highest-version endpoint 108 that Product A, version 1 supports.

Unlike the client 102, the client 103 has version 2 of Product A installed, and thus is aware that it is not using the additional functionality of version 2 (i.e., is still communicating with Product B by way of endpoint 108, which corresponds to functionality present in Product A, version 1), and thus does not ignore the message from Product B that a newer version of Product B is available. Upon receiving the message from the server 104, the client 103 determines the location of the endpoint 109 of the newer version of Product B. In an exemplary embodiment, the client 103 accesses the service document 111 provided by Product B to discover the latest version of Product B that the client 103 supports and the location of the endpoint 109 associated with that version. In an alternate embodiment, the client 103 receives the location of the endpoint 109 associated with the latest version of Product B directly from the server 104 either as a part of the message notifying the client 103 that a newer version of Product B exists, or in a separate message from the server 104.

If the client 103 determines that it supports the newer version of Product B, then the client 103 sends future requests to the endpoint 109 of the newer version of Product B using integration 106c. When the server 104 receives a request at the endpoint 109, the server 104 knows that the requesting client 103 possesses the capability to receive enhanced functionality made available by version 2 of Product B. However, the client 102 continues to send requests to the endpoint 108 of the older version of Product B because the client 102 cannot yet support the newer version of Product B. In accordance with various embodiments, there is no need to configure the individual clients 102, 103 with a new endpoint 109 location each time a service offered by the server 104 is upgraded.

In accordance with various embodiments, the above-described discovery and notification processes enable the server 104 to inform one or more clients 102, 103 at runtime that a newer version of a service offered by the server 104 is available. Additionally, the server 104 informs the one or more clients 102, 103 at runtime which versions of the service are available. Still further, the server 104 informs the one or more clients 102, 103 of how to access each version (e.g., by associating each version with an endpoint 108, 109 in, for example, the service document 111 or in a separate notification message). Thus, client applications operating on the clients 102, 103 do not need to be reconfigured to identify or access a new version of a service with which the client applications interact.

Figure 2:
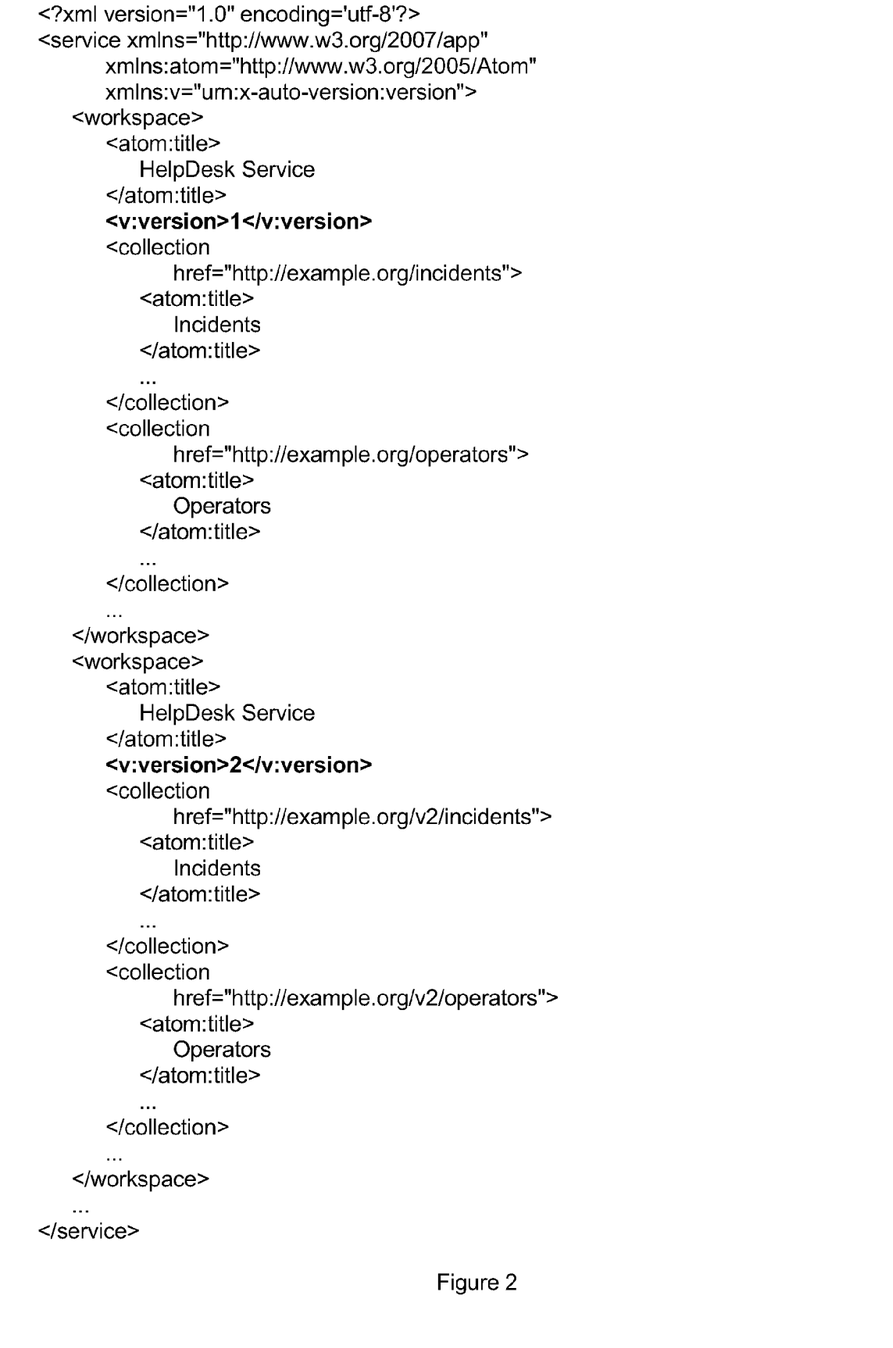
FIG. 2 shows an exemplary service document in accordance with various embodiments.

In accordance with various embodiments, the service document 111 of a service represents that more than one version of the service is supported. FIG. 2 shows an example of a service document 111 that illustrates using the workspace grouping to advertise two versions of a service. In this example, the endpoint of the newer version of the HelpDesk Service contains "/v2/" in its URL to differentiate it from the older version of the HelpDesk Service. However, it is not necessary for the URL of version 1 to be different from the URL of version 2.

In accordance with various embodiments, the clients 102, 103 access the service document 111 periodically to determine whether the client 102, 103 is using the latest endpoint for a particular service. In alternate embodiments, the server 104 notifies the client 102, 103 in the server's 104 response that a newer version of a service is available through the use of a version element. In some embodiments, the version element comprises a link relation ("<link rel= . . . "), which identifies a link (e.g., to a URL) and defines the reason for accessing the link. The use of a "newer-version" link relation in a response from the server 104 indicates that the value of the "href" attribute associated with the link relation is the URL of the endpoint of a newer version of the service. The use of a service document element, for example a "service-document" link relation, in a response from the server 104 indicates that the value of the "href" attribute associated with the link relation is the URL of the location of the service document 111. The response from the server 104 notifies the client 102, 103 of the existence of a newer version of the service. However, the response is provided using the same version of the service that the client 102, 103 used in its request, as the server 104 is not yet aware whether the client 102, 103 supports the newer version of the service.

Figure 3:
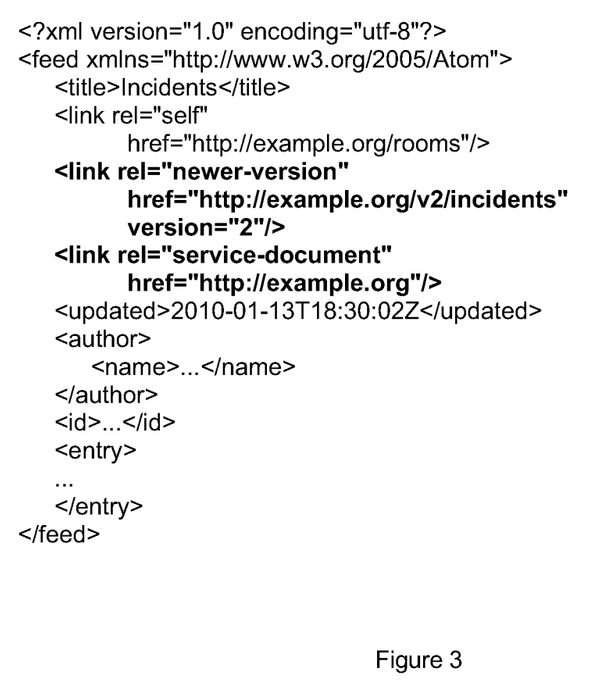
FIG. 3 shows an exemplary response from a server in accordance with various embodiments.

FIG. 3 shows an example of a response from the server 104 indicating that a newer version of a service is available. In this example, if the client 102, 103 supports the newer version of the service, the client 102, 103 may access the service document 111. In some embodiments, the service document 111 is accessed at the URL associated with the "service-document" link relation to determine which version of the service is appropriate (i.e., the highest version that the client 102, 103 supports) and its associated endpoint. Alternatively, the client 102, 103 may use the endpoint information provided for the newer version notification in the response from the server 104. In some embodiments, the endpoint information comprises the URL associated with the "newer-version" link relation.

Figure 4:
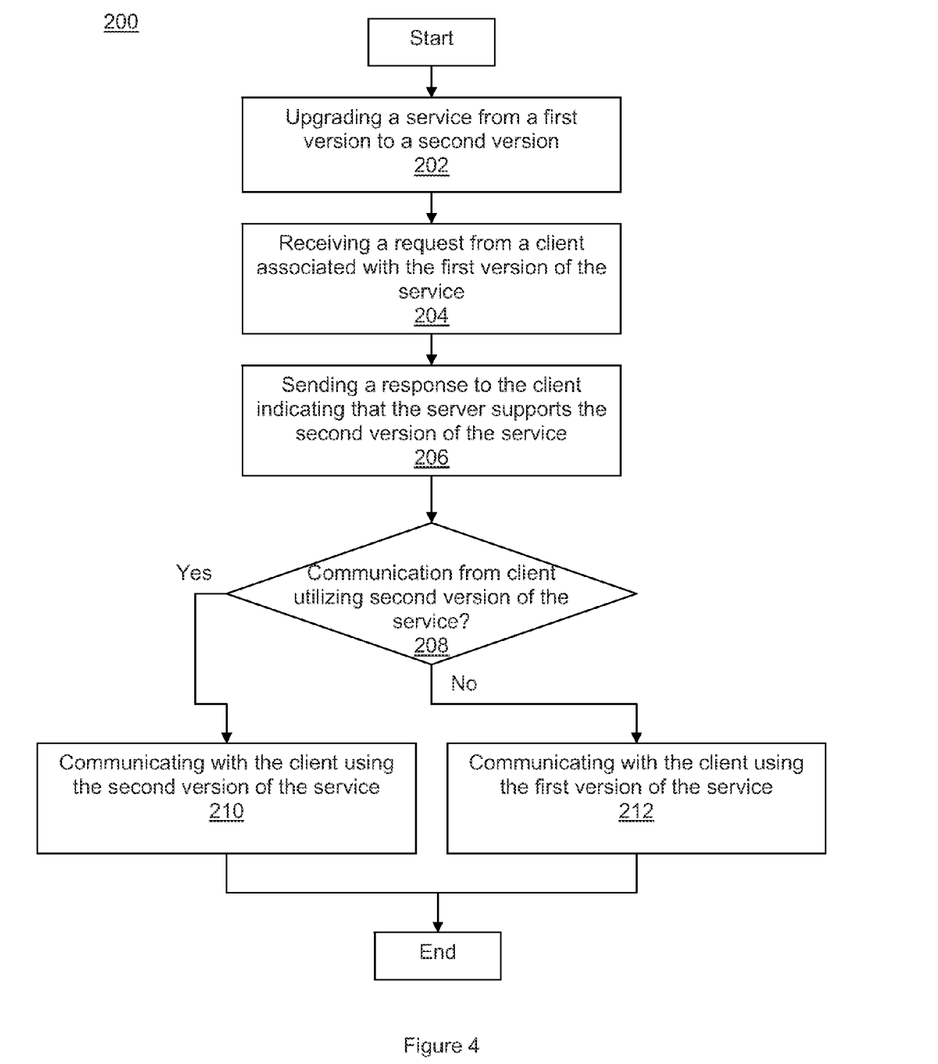
FIG. 4 shows a method flow chart in accordance with various embodiments.

FIG. 4 shows a method 200 in accordance with various embodiments. In accordance with various embodiments, the method 200 is implemented on a server (e.g., server 104). The method 200 begins with upgrading a service from a first version to a second version (block 202). The service may be, for example, provided by a product installed on a server 104. In an exemplary embodiment, the product is configured to form a solution with other products installed on one or more clients 102, 103. The second, newer version of the service may, for example, add the ability to receive a request for and provide additional diagnostic information in a record produced by a service of the product installed on the server 104.

The method 200 continues with receiving a request from a client 102, 103 associated with the first version of the service (block 204). In an exemplary embodiment, the server 104 determines that the request is associated with the first version of the service based on receiving the request at an endpoint 108 that is associated with the first version of the service. The server 104 can provide a newer version of the service than that requested by the client 102, 103, and thus the method 200 continues with sending a response to the client 102, 103 indicating that the server supports the second version of the service (block 206). As discussed above, the indication that the server supports the second version takes the form of a notification embedded in the response from the server 104 to the client's 102, 103 request.

If the server 104 receives a communication from the client 102, 103 utilizing the second version of the service (decision block 208), then the method 200 continues with the server 104 communicating with the client 102, 103 using the second version of the service (block 210) and ends. The server 104 determines that the client 102, 103 supports and thus is utilizing the second version of the service based receiving the communication at the endpoint 109 associated with the second version. If the client 102, 103 does not support and thus does not utilize the second version of the service (decision block 208) (i.e., continues to communicate using the endpoint 108), then the method 200 continues with the server 104 communicating with the client 102, 103 using the first version of the service (block 212) and ends.

Figure 5:
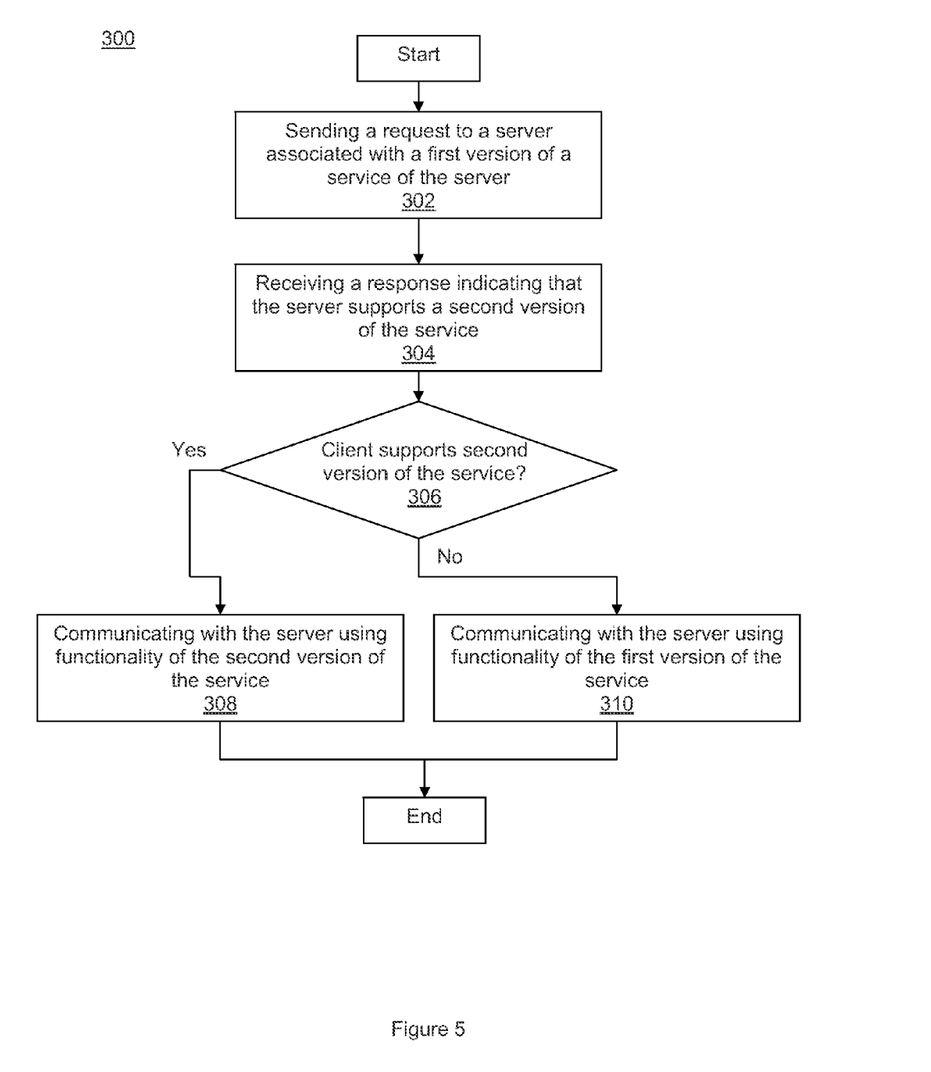
FIG. 5 shows another method flow chart in accordance with various embodiments.

FIG. 5 shows another method 300 in accordance with various embodiments. In accordance with various embodiments, the method 300 is implemented on a client (e.g., client 102, 103). The method 300 begins with a client 102, 103 sending a request to a server 104 associated with a first version of a service of the server 104 (block 302). The service may be, for example, offered by a product installed on the server 104. In an exemplary embodiment, the product is configured to form a solution with other products installed on the clients 102, 103. The second, newer version of the service may, for example, add the ability for the clients 102, 103 to request additional diagnostic information in a record produced by the service of the product installed on the server 104.

The method 300 continues with receiving a response from the server 104 indicating that the server supports a second version of the service (block 304). As discussed above, the indication that the server supports the second version takes the form of a notification embedded in the response from the server 104 to the client's 102, 103 request.

If the client 102, 103 supports the second version the service (decision block 306), then the method 300 continues with the client 102, 103 communicating with the server 104 using the second version of the service (block 308) and ends. The client 102, 103 communicates with the server 104 using functionality of the second version of the service by using the endpoint 109 to access the second version of the service. If the client 102, 103 does not support the second version of the service (decision block 306) then the method 300 continues with the client 102, 103 communicating with the server 104 using the first version of the service (block 310) through the endpoint 108 and ends.

Figure 6:
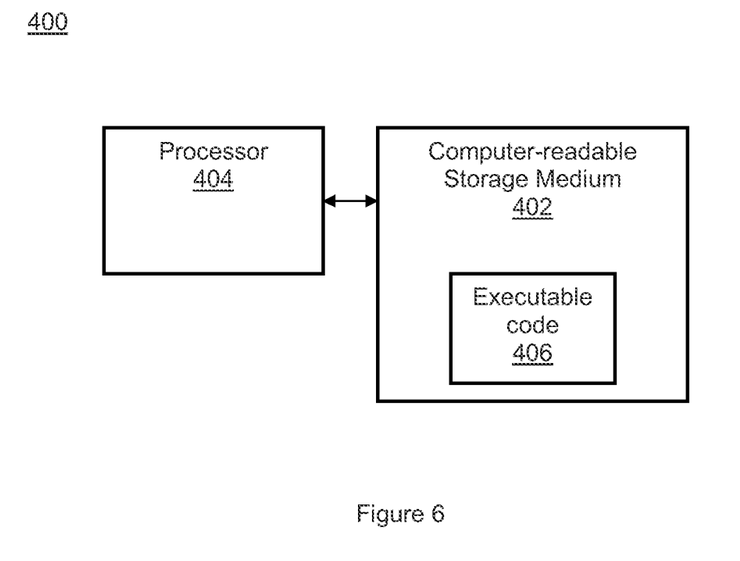
FIG. 6 shows a system and computer-readable medium in accordance with various embodiments.

FIG. 6 shows a computer system 400 in accordance with various embodiments. In at least some embodiments, a computer-readable storage medium 402 stores code 406 that, when executed, cause a processor 404 to perform all or part of the methods 200, 300. Although not required, the computer-readable storage medium 402 may comprise a portable memory (e.g., an optical disk or flash memory). The computer-readable storage medium 402 may comprise volatile memory (e.g., random access memory), non-volatile memory (e.g., hard disk drive), or combinations thereof. In some embodiments, the processor 404 is a part of the client 102, 103 or server 104. Any of the clients 102, 103 or server 104 may be implemented using the computer system 400. Some or all of the functions described herein may be performed by, for example, processor 404 executing code 406.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A method comprising:
upgrading, at a client, a client application from a first version to a second version, the client application to interact with a service at a server;
upgrading, at the server, the service from a first version to a second version, wherein the client application is upgraded to the second version at a time different than when the service is upgraded to the second version;
receiving, at the server, a request from the client associated with the first version of the service via a first endpoint,
wherein the client is unaware as to whether the service has been upgraded to the second version;
as a result of the service not being upgraded to the second version, sending a first response to the client indicating that the server supports the first version of the service via the first endpoint;
as a result of the service being upgraded to the second version, sending a second response to the client indicating that the server supports the second version of the service via a second endpoint, wherein each of the first and the second responses comprises a service document element identifying a service document, the service document containing a listing of versions of the service supported by the server and an endpoint associated with each version;
communicating with the client using the first version of the service as a result of receiving a communication from the client utilizing the first version of the service after sending the first response; and communicating with the client using the second version of the service as a result of receiving a communication from the client utilizing the second version of the service after sending the second response.

2. The method of claim 1 wherein each of the first and the second responses comprises one or more version elements, each version element identifying an endpoint of a version of the service supported by the server.

3. The method of claim 2 wherein receiving the communication from the client utilizing the second version of the service further comprises receiving the communication from the client at the second endpoint.

4. The method of claim 1 further comprising:
receiving, at the server, a request from a second client associated with the first version of the service;
as a result of the server not being upgraded to the second version, sending a response to the second client indicating that the server supports the first version of the service;
as a result of the server being upgraded to the second version, sending a response to the second client indicating that the server supports the second version of the service;
communicating with the second client using the second version of the service as a result of receiving a communication from the second client utilizing the second version of the service after sending the response to the second client; and
communicating with the second client using the first version of the service as a result of not receiving a communication from the second client utilizing the second version of the service after sending the response to the second client.

5. The method of claim 1 wherein the service comprises a standalone application and the client comprises another standalone application.

6. The method of claim 1 further comprising:
receiving a request from the client for the versions supported by the service; and
sending a response to the client indicating the supported versions of the service.

7. A method comprising:
upgrading, at a client, a client application from a first version to a second version, the client application to interact with a service at a server;
sending, by the client and via a first endpoint, a request to a server associated with a first version of the service of the server,
wherein the client is unaware as to whether the service has been upgraded to a second version;
receiving a response via the first endpoint indicating either that the server supports the first version of the service or that the server supports the second version of the service, the second version newer than the first version, wherein the response comprises a service document element identifying a service document, the service document containing a listing of available versions of the service and an endpoint associated with each version;
communicating, by the client and via a second endpoint, with the server using functionality of the second version of the service, after receiving the response, as a result of the client application being upgraded to the second version and supporting the second version of the service; and
communicating, by the client and via the first endpoint, with the server using functionality of the first version of the service as a result of the client application not yet being upgraded to the second version and not supporting the second version of the service.

8. The method of claim 7 wherein the response comprises one or more version elements, each version element identifying an endpoint of a version of the service supported by the server.

9. The method of claim 8 further comprising:
identifying the newest version having endpoints identified by the version elements that the client supports;
communicating with the server using the endpoint of the newest version.

10. The method of claim 7 further comprising:
identifying the newest version of the service in the service document that the client supports;
communicating with the server using the endpoint associated with the newest version.

11. The method of claim 7 wherein communicating with the server using functionality of the second version of the service further comprises communicating without reconfiguring the client.

12. The method of claim 7 wherein the service comprises a standalone application and the client comprises another standalone application.

13. The method of claim 7 further comprising:
sending a request to the server for the versions supported by the service; and
receiving a response from the server indicating the supported versions of the service.

14. A non-transitory computer-readable storage medium containing executable code that, when executed by a processor, causes the processor to:
upgrade a client application from a first version to a second version, the client application to interact with a service at a server;
send a request, via a first endpoint, to the server associated with a first version of the service of the server,
wherein the client is unaware as to whether the service has been upgraded to the second version;
receive a response, via the first endpoint, that indicates either that the server supports the first version of the service or that the server supports a second version of the service, the second version newer than the first version, wherein the response comprises a service document element identifying a service document, the service document containing a listing of available versions of the service and an endpoint associated with each version;
communicate with the server using functionality of the second version of the service and via a second endpoint, after receiving the response, as a result of the client application being upgraded to the second version and supporting the second version of the service; and
communicate with the server using functionality of the first version of the service and via the first endpoint as a result of the client application not yet being upgraded to the second version and not supporting the second version of the service.

15. The non-transitory computer-readable storage medium of claim 14 wherein the response comprises one or more version elements, each version element identifying an endpoint of a version of the service supported by the server.

16. The non-transitory computer-readable storage medium of claim 15 wherein the executable code further causes the processor to:
identify the newest version that has endpoints identified by the version elements that the client supports;

communicate with the server through the endpoint of the newest version.

17. The non-transitory computer-readable storage medium of claim 14 wherein if the processor communicates with the server using functionality of the second version of the service, then the processor communicates without reconfiguring the client.

18. The non-transitory computer-readable storage medium of claim 14 wherein the executable code further causes the processor to:
   send a request to the server for the versions supported by the service; and
   receive a response from the server indicating the supported versions of the service.

\* \* \* \* \*